April 30, 1929.  E. DAVIS  1,711,450
PISTON OR PLUNGER CONSTRUCTION
Filed March 31, 1927
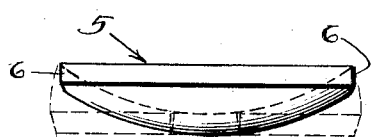
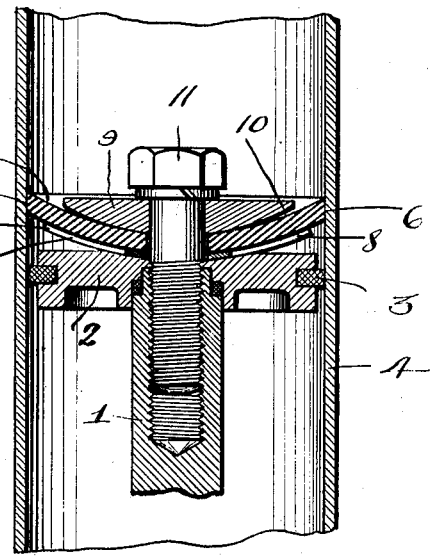
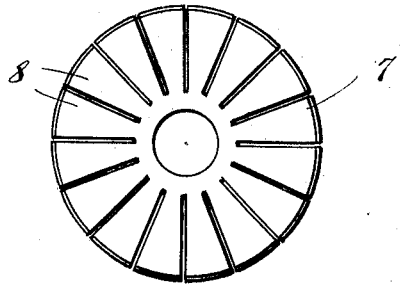
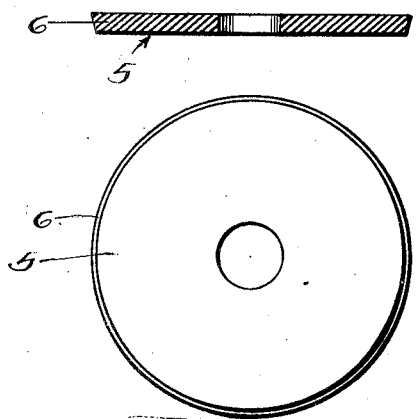
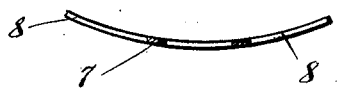
INVENTOR.
BY Ernest Davis
Parsons & Bordell,
ATTORNEYS.

Patented Apr. 30, 1929.

1,711,450

UNITED STATES PATENT OFFICE.

ERNEST DAVIS, OF SYRACUSE, NEW YORK, ASSIGNOR TO THE PROSPERITY COMPANY INC., OF SYRACUSE, NEW YORK, A CORPORATION OF NEW YORK.

PISTON OR PLUNGER CONSTRUCTION.

Application filed March 31, 1927. Serial No. 179,993.

This invention has for its object a particularly simple and efficient piston construction for use in air, steam or hydraulic cylinders, and especially a piston construction by which the piston is at all times tight and will not develop looseness or leak even after a long period of use.

The invention consists in the novel features and in the combinations and constructions hereinafter set forth and claimed.

In describing this invention reference is had to the accompanying drawings in which like characters designate corresponding parts in all the views.

Figure 1 is a longitudinal, sectional view through a piston embodying my invention, the cylinder being also shown.

Figure 2 is a detail elevation of the packing disk.

Figure 3 is an edge view of the packing disk before it is dished.

Figure 4 is a plan view thereof.

Figures 5 and 6 are respectively a plan and cross sectional view of a reinforcing support, backing disk or washer.

This piston comprises generally a packing disk of yielding resilient and somewhat elastic or expansible material, or a material the molecules of which will flow under compression, and means for holding clamped the disk so that it expands edgewise, and its edge snugly engages the cylinder wall. The disk may be of any material having these quantities, and one material is known as dichtungsgummi. It is not injured by oil, steam or water or heat. Preferably to facilitate the expanding of a disk, it is dished and held in dished form by a sheet metal washer or backing disk, and it is expanded by a clamping member acting on the inner face of the dished disk, this clamping member having a convex or spherically curved face shaped to press against the packing disk at the central portion thereof, the convex face diverging toward its outer end from the inner face of the packing disk so that the pressure of the clamping member compresses the central part of the soft disk causing the lower portion thereof which rests against the backing disk to spread or flow outwardly to a greater extent than the portion underlying the clamping member, and forcing the edge of the packing disk snugly against the cylinder wall. The piston is also provided with means engaging the cylinder wall for centering the piston so that the packing means is relieved of the duty of holding the piston centered.

1 is the rod of the piston, it usually having a discoidal head 2, which has a ring 3 engaging the wall of the cylinder 4 for guiding the piston, the centering ring being of a metal similar to Babbitt metal.

5 is the packing disk of a compressible or expansible yielding resilient and somewhat elastic material, this material having a rubber base. The disk 5 has a bevelled edge 6, which comes squarely against the cylinder wall when the disk 5 is dished.

7 is a backing support or washer for the packing disk, this support being of sheet metal and preferably composed of a plurality of radial tongues 8. The backing member 7 is usually a disk or washer slotted radially to form the tongues 8.

9 is the clamping member having a convex face 10, the clamping member being arranged on the opposite side of the disk 5, to that on which the backing washer 7 is located, and the convex face 10 being so formed as to bear against the central portion of the disk 5 and to diverge away from the packing disk 5 toward the outer edge of the clamping member. Both the backing disk 7 and the clamping member 9 terminate short of the edge of the packing disk 5, and the clamping member 9 is also of less diameter than the backing 7. Owing to the fact that the face 10 presses against the disk 5 at the central portion only, the disk 5 under the compression expands edgewise or the molecules thereof flow edgewise and press the edge 6 snugly against the cylinder wall without folding the disk 5.

The disk 5, backing 7 and clamping member 9 are assembled on the piston rod 1 and the clamping member clamped in position by a screw 11 extending centrally through the clamping member 9, disk 5 and backing 7, and threading axially into the piston rod 1.

Owing to the arrangement of the packing disk 5, it makes the piston air, steam, water and oil tight without folding, and the edge thereof is always pressed against the cylinder wall during the power strokes, that is, when the pressure is applied to the top of the piston, Figure 1, and owing to the clearance between the convex face of the clamping member 9 and the upper face of the disk 5, the disk 5 is free to slide easily in the cylinder during the retrograde or downward strokes of the piston. Owing to the flexibility, within limits, of the backing 7, the disk 5 is free to flatten somewhat during the power stroke of the piston.

What I claim is:

1. The combination with a cylinder, of a piston movable in the cylinder and having a head comprising a disk of yielding resilient material, a yielding backing for the disk for holding the disk dished, a clamping member engaging the disk on the opposite side to that on which the backing is located and bearing on the disk around the central portion thereof and being of less diameter than the diameter of the disk whereby the outer margin of the disk is free of the clamping member.

2. The combination with a cylinder, of a piston movable in the cylinder, and having a head comprising a disk of yielding resilient material, a yielding backing for the disk for holding the disk dished, and a clamping member engaging the disk on the opposite side to that on which the backing is located and bearing on the disk around the central portion thereof, the clamping member having a convex engaging face diverging from the dished disk toward the outer edge of the clamping member.

3. The combination with a cylinder, of a piston movable in the cylinder having a head comprising a disk of yielding resilient material having a beveled edge, means for dishing the disk and compressing the same, said means comprising a concave backing for the disk and terminating short of the outer edge of the disk, and a clamping member having a convex face pressing on the opposite side to the disk to that on which the backing is located, said convex face diverging away from the disk toward the outer edge of the clamping member whereby the clamping member compresses the central portion of the disk against the backing and causes the disk to expand radially.

4. The combination with a cylinder; of a piston movable in the cylinder having a head comprising a disk of yielding resilient material, a concave washer forming a backing for the disk, and including radially extending spring tongues, and a clamping member having a convex face engaging the opposite side of the disk to that on which the washer is located and having the central apex portion of its convex face pressing against the central portion of the disk.

5. The combination with a cylinder; of a piston movable in the cylinder having a head comprising a disk of yielding resilient material, a concave washer forming a backing for the disk, a clamping member having a convex face engaging the opposite side of the disk to that on which the washer is located, and having the central apex portion of its convex face pressing against the central portion of the disk, the washer and the clamping member terminating short of the edge of the disk, and the clamping member being of less diameter than the washer.

6. The combination with a cylinder; of a piston movable in the cylinder, and having a head comprising a disk of yielding resilient material engaging at its edge the wall of the cylinder, a concave washer forming a backing for the disk, a clamping member having a convex face on the opposite side of the disk to that on which the backing is mounted, the central portion of the convex face of the clamping member pressing against a central portion of a disk, and the outer portion of the convex face diverging from the disk.

In testimony whereof, I have hereunto signed my name, at Syracuse, in the county of Onondaga, and in the State of New York, this 12th day of March, 1927.

ERNEST DAVIS.